United States Patent [19]

Childre

[11] 3,995,579
[45] Dec. 7, 1976

[54] DUAL MOTOR PROPULSION AND STEERING CONTROL SYSTEM

[75] Inventor: Lewis Childre, Foley, Ala.
[73] Assignee: Lew Childre & Sons, Inc., Foley, Ala.
[22] Filed: May 23, 1975
[21] Appl. No.: 580,475
[52] U.S. Cl. .............................. 115/18 E
[51] Int. Cl.² ............................. B63H 21/26
[58] Field of Search .............. 115/17, 18 R, 18 E, 115/18 A, 37, 38, 41 R; 248/221 R, 221 F; 200/86.5; 114/144 RE

[56] References Cited
UNITED STATES PATENTS

| | | | |
|---|---|---|---|
| 2,877,733 | 3/1959 | Harris | 115/18 E |
| 3,426,723 | 2/1969 | Specht | 115/41 R |
| 3,467,798 | 9/1969 | Krieger | 200/86.5 |
| 3,596,625 | 8/1971 | Guenther | 115/18 A |
| 3,598,947 | 8/1971 | Osborn | 115/18 R |
| 3,848,561 | 11/1974 | Price | 115/37 |

Primary Examiner—Trygve M. Blix
Assistant Examiner—Stuart M. Goldstein
Attorney, Agent, or Firm—Lockwood, Dewey, Zickert & Alex

[57] ABSTRACT

A propulsion and steering control system for a fishing boat wherein a pair of reversible electric motors are mounted in a fixed angular relationship to each other of from approximately 30° to 120° as defined between the respective axes of rotation of the propellers of such motors. A control device is provided which, in a preferred embodiment, is a substantially flat, foot-actuated pivotally mounted plate which can be rocked in a fore or aft direction as well as a right or left direction for actuating appropriate switches which enable the operator to selectively and independently produce a forward or reverse thrust with any one or both of the angularly oriented motors, thereby enabling the operator to achieve a desired propulsion and steering control for the fishing boat while maintaining the motors in the fixed relationship to each other and without requiring turning of either of the motors.

20 Claims, 14 Drawing Figures

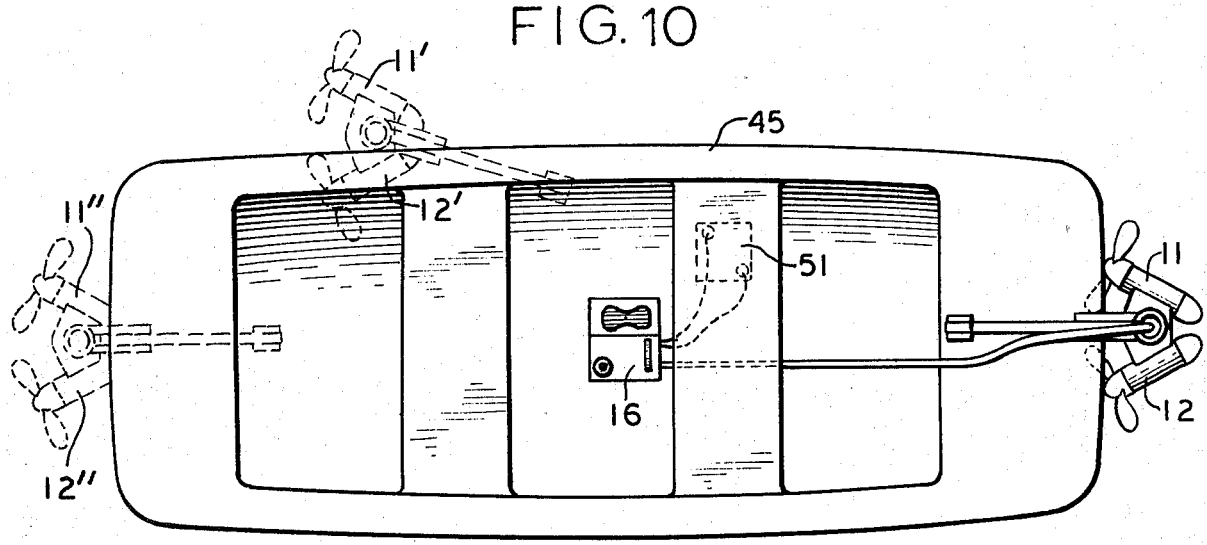
FIG. 10
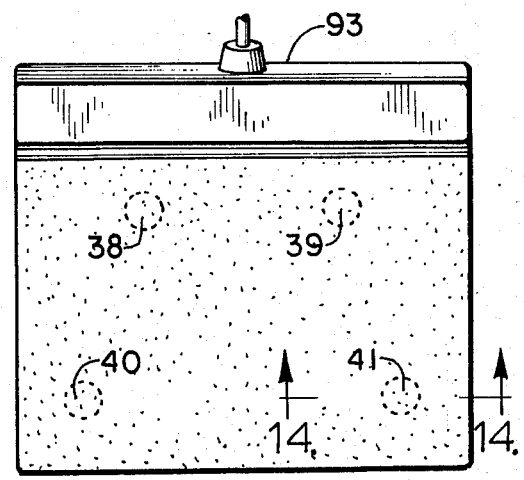
FIG. 13
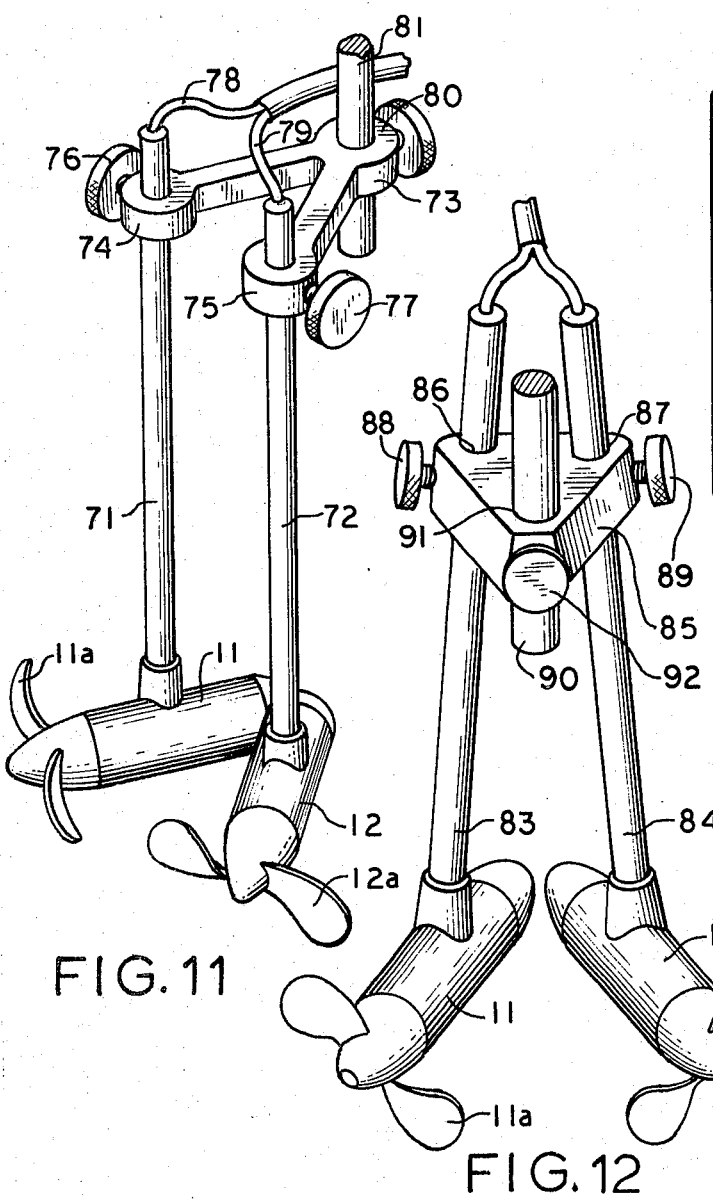
FIG. 11
FIG. 12
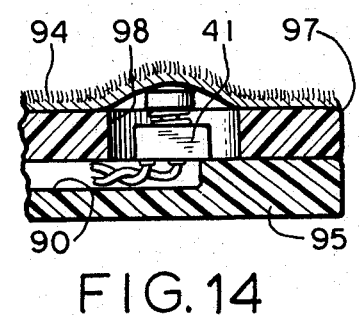
FIG. 14

DUAL MOTOR PROPULSION AND STEERING CONTROL SYSTEM

BACKGROUND AND DESCRIPTION OF THE INVENTION

This invention generally relates to motors for fishing boats and, more particularly, to an improved dual motor propulsion and steering control system. In this regard, an important embodiment of the present invention is directed to an assembly wherein a pair of reversible electric motors are mounted to a common support in a fixed angular relationship to each other and selectively and independently regulated by foot-actuated controls operatively associated therewith.

Recently, it has become increasingly popular to use one or more battery operated electric motors for propelling a fishing boat at relatively slow speeds for trolling or slow movement while casting. These systems are particularly suited for bass fishing and can be advantageously used as auxiliary power systems in addition to a more powerful outboard motor when silent slow speeds are desired.

While many such electric motor systems of this general type have been proposed, some of which being commercially available today, all of these prior art systems are characterized by inadequacies and disadvantages which render them less than fully satisfactory for their intended purpose.

One disadvantage of some of these electric motor control systems is that they are completely hand operated, that is, both the steering and speed control functions thereof are accomplished by use of the hands of the operator of the boat. In order to control the direction of travel, the single motor thereof must be manually rotated in the manner of the operation of a boat tiller, while the speed is controlled by a hand operated switch or rheostat. As is apparent, this type of trolling motor system significantly reduces the available time that the operator has for fishing since both of his hands must be occupied in connection with the operation of the motor for a consideration portion of the time.

Efforts to overcome the disadvantages of the foregoing system have essentially concerned themselves with the use of foot pedal steering devices. In these arrangements, a foot pedal is normally pivoted on a base plate which rests on the bottom of the fishing boat and is connected with the trolling motor steering or turning mechanism by a cable or lever arrangement whereby an up-down or pivotal action of the foot pedal steers the boat. For example, a heel-down, toe-up motion of the foot may be required to turn the boat in one direction with a heel-up, toe-down motion of the foot then being required to turn the boat in the opposite direction. Since steering is perhaps the most time consuming portion of the operation of such a low speed electric motor, the foot pedal steering mechanism does free the fisherman's hands most of the time, however, control of motor speed therewith is still accomplished by hand controls. Additionally, these foot pedal steering systems require substantial pedal travel in order to effect adequate steering control, thereby necessitating that at least a portion of the pedal be substantially elevated and resulting in the pedal device itself being, at the very least, awkward to use.

Other systems for effecting relatively low speed propulsion and steering control have concerned themselves with the use of dual electric motors. These prior art systems, however, are characterized by the provision of parallel orientated motors. As such, these systems necessitate that the motors themselves be spaced apart a substantial distance and usually requiring that they be located at the mid-boat portion along the outer sides thereof wherein they restrict the locations in which the boat can travel due to possible interference with vegetation, rocks and the like. Moreover, these systems necessitate the use of two separate motor support brackets which not only add to the expense and complexity of such systems, but also reduce the available fishing time of the operator thereof since they often must be individually raised and lowered during a given day of fishing. Additionally, in view of the fact that these particular systems require that the motors be mounted in wide spaced-apart relationship to each other, the mountin thereof in an efficient and out-of-the-way location such as, for example, at the prow or center of the stern of the boat is virtually precluded.

Speed control or variation is important with all of these systems since the operator usually desires to have low speeds when he is trolling or casting, however, that operator will require abrupt substantial increases in speed when, for example, a heavy, gusty wind urges the boat to an undesired location or he desires to travel to another fishing spot relatively remotely located from the spot he has fully worked. while certain of the foot pedal steering systems described above have included speed control systems which can be foot-actuated, these devices have been characterized by awkwardness of use and/or undue complexity, thereby rendering them less than fully satisfactory.

The foregoing problems and disadvantages of the prior art have been overcome by the novel propulsion and steering control system of the present invention which generally includes a pair of reversible electric motors which are mounted in a fixed angular relationship to each other of from approximately 30° to 120°, as defined between the respective axes of rotation of the motor propellers. A control means is provided which, in a preferred embodiment, is a foot-actuated pivotally mounted plate which, with a minimum of movement, can be rocked in a fore or aft direction as well as right or left direction to actuate the appropriate switches which will achieve the desired propulsion and/or steering effect. Variable speed control of the motors is achieved through the use of a control circuit which includes first and second operating modes which can be selectively activated by means of a simple button switch located adjacent the foot-actuated pivotally mounted plate. In this arrangement, the first operating mode enables the motors to be given at a selectively variable operator preset reduced speed and the second operating mode enables the motors to be driven at a maximum speed, whereby a quick speed change can be effected without requiring hand operation, thereby providing the operation with improved speed and steering control of the fishing boat and permitting him to have both hands free at all times for fishing purposes.

It is, therefore, an important object of the present invention to provide an improved propulsion and sterring control system for a fishing boat.

Another object of the present invention is to provide an improved propulsion and steering control system which does not require motor rotation in order to achieve steering control in a fishing boat equipped therewith.

Another object of the present invention is to provide an improved propulsion and steering control system for a fishing boat which utilizes dual reversible electric motors which can be mounted at any desired location in a fishing boat and which, in particular, can be advantageously positioned at the prow or mid-stern portions of the boat.

Another object of the present invention is to provide an improved control means for dual electric motors which utilizes a plate contoured to fit the operator's shoe and which requires very little movement in order to achieve the required switch actuation for a pair of electric motors associated therewith which will effect the desired propulsion and steering thrust from said motors.

Another object of the present invention is to provide an improved speed control unit for a dual electric motor control system which enables an operator to quickly shift from a selectively variable preset relatively low speed to a substantially increased full speed by merely depressing a conveniently located button switch.

These and other objects of the present invention will be apparent from the following detailed description thereof wherein identical numerals have been used throughout to designate like parts and wherein:

FIG. 10 is a plan view of a fishing boat illustrating the dual motor and control unit assembly of the present invention mounted adjacent the prow thereof and also illustrating in phantom other suitable locations for such assembly;

FIG. 11 is a fragmentary perspective view of another embodiment of the present invention;

FIG. 12 is a fragmentary perspective view of a further embodiment of the present invention;

FIG. 13 is a plan view of a modified control unit of the present invention; and

FIG. 14 is a sectional view of the control unit shown in FIG. 13 taken along the line 14—14 of FIG. 13.

Figure 1:
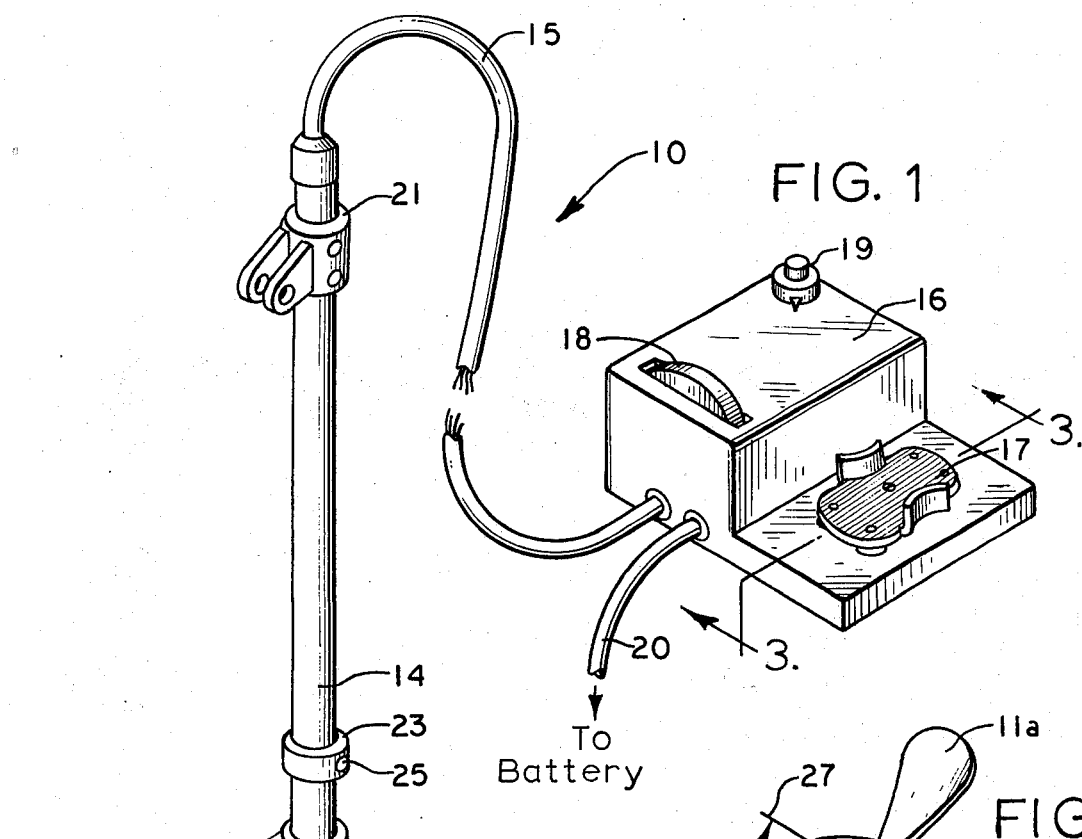
FIG. 1 is a perspective view with portions thereof removed of a dual motor and control unit assembly embodying features of the present invention.

Referring to the drawings and with particular reference to FIG. 1, the reference numeral 10 generally designates a dual motor and control unit assembly embodying features of the present invention. As shown, the assembly 10 includes a pair of reversible electric motors 11 and 12 which are fixed to a spacer block 13 which, in turn, is mounted to one end of a shaft 14. In the illustrated embodiment, shaft 14 is of a tubular construction enabling electrical wires 15 to pass therethrough and out of the opposite end of the shaft 14. Wires 15 are connected to a control unit 16 which includes a plate member 17 shaped to snugly receive an operator's shoe (not shown), a variable speed selector potentiometer control 18 and a button type switch 19 which, as will be described more fully below, enables an operator to drive the motors 11 and 12 at a selectively variable preset reduced speed established by the potentiometer control 18 or at a maximum speed as desired. An electrical line 20 operatively connects the system to a suitable power supply such as, for example, one or more conventional lead acid-type storage batteries.

It will be appreciated that motors 11 and 12 can be of any suitable size and type such as, for example, the 6, 12 and 24 volt variety commonly available on the market today. The voltage requirements of the batteries will, of course, determine the number and size of the storage batteries employed. It will further be appreciated that the shaft 14 represents one form of a motor support bracket which can be used but that the present invention is not limited to any particular motor support bracket construction and that equivalent bracket supports will be apparent to those skilled in the art. The shaft 14 in this illustrated embodiment is shown to include a pair of slidable sleeve members 21 and 22, the latter which is restricted in its axial movement by a pair of spaced apart collars 23 and 24 fixed at specific locations along the shaft 14 by appropriate set screws 25 and 26.

Figure 2:
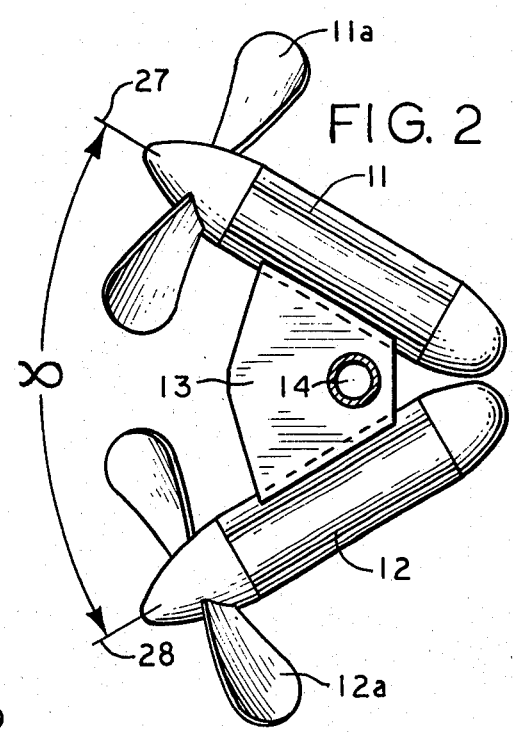
FIG. 2 is a plan view illustrating the motor orientation of the assembly shown in FIG. 1 taken along the section line 2—2 of FIG. 1.
Figure 3:
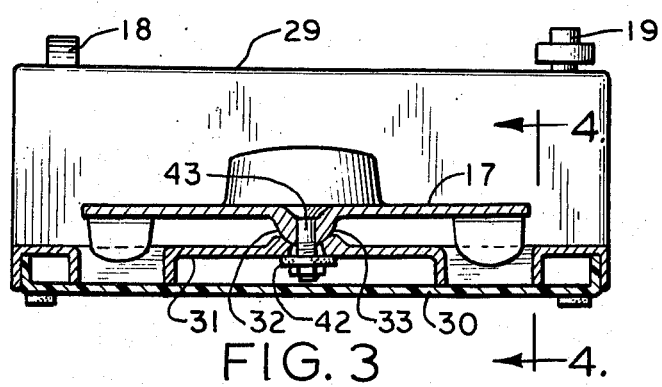
FIG. 3 is a sectional view of the control unit shown in FIG. 1 taken along the line 3—3 of FIG. 1.
Figure 4:
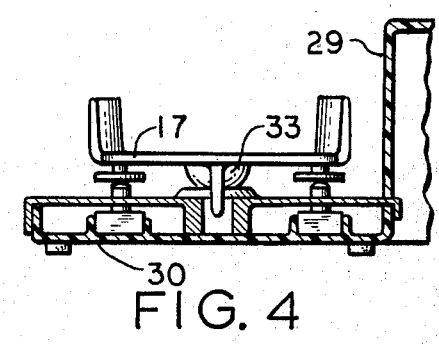
FIG. 4 is a fragmentary sectional view of the control unit shown in FIG. 1 taken along the line 4—4 of FIG. 3.
Figure 5:
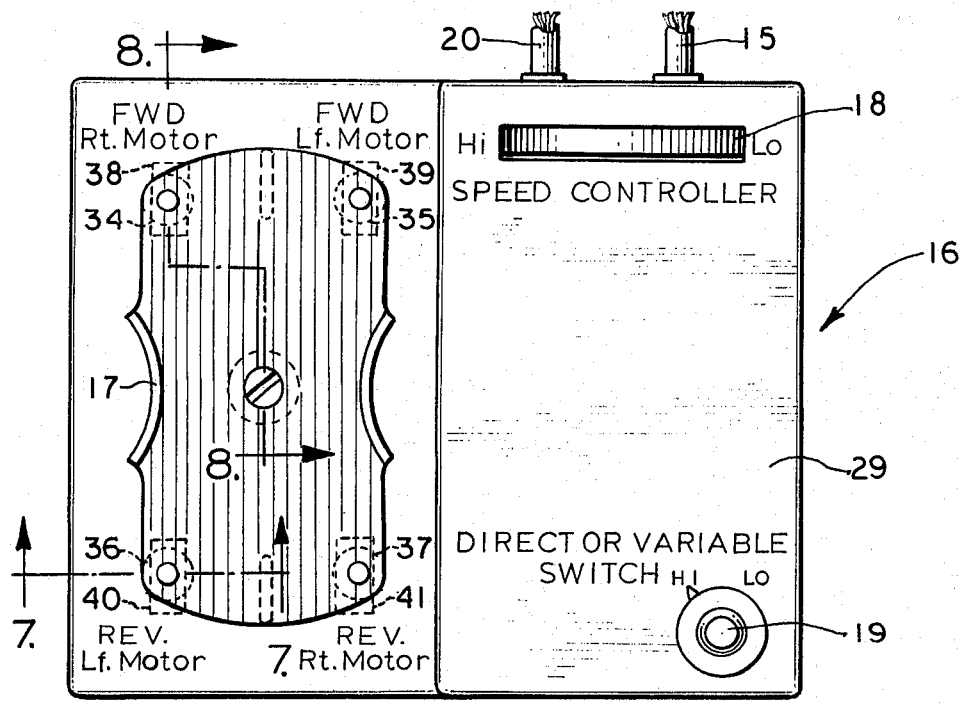
FIG. 5 is a detailed plan view of the control unit shown in FIG. 1.
Figure 7:
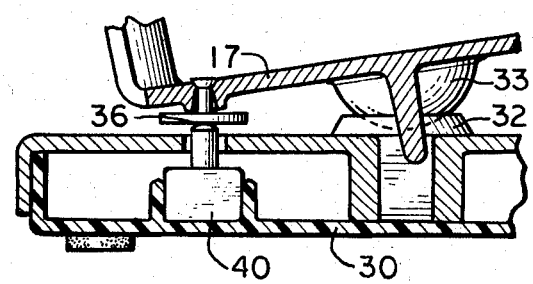
FIG. 7 is a fragmentary sectional view of the control unit shown in FIG. 5 taken along the line 7—7 of the FIG. 5.

In accordance with an important aspect of the present invention and as best depicted in FIG. 2, the reversible electric motors 11 and 12 are mounted in a fixed angular relationship to each other which, as defined by and between the axes of rotation 27 and 28 of the motors 11 and 12, respectively, ranges from approximately 30° to 120° and which preferably is an angle of approximately 60°. This specific angular relationship is essential to the present invention in that it affords satisfactory forward thrust and, at the same time, satisfactory lateral control or steering ability. The preferred angular relationship of approximately 60° represents the most effective combination of forward thrust and steering control and is particularly suitable for use wherein the assembly 10 is mounted adjacent the prow of midstern portions of a fishing boat.

Referring to FIGS. 3, 4, 5, 7, and 8, the control unit 16 is shown to include a housing 29 which is supported upon a base 30 which is adapted to fit on the boat bottom. The use of flexible electrical lines 15 and 20 enables an operator to position the control unit at any convenient location in the boat from which he can conduct his fishing operation. As shown, a central support 31 is mounted on top of the base 30 and includes a socket 32 which is adapted to rockably receive a pivot point 33 integrally formed with and on the underside of plate member 17. The corner portions of the undersurface of plate 17 include four downwardly extending switch actuating contact members 34, 35, 36 and 37 which respectively are adapted to actuate four foot switches 38, 39, 40 and 41. As is more fully described in conjunction with the circuit shown in FIG. 9, actuation of foot switch 38 results in the production of a forward thrust from the right motor 12, actuation of foot switch 39 results in the production of a forward thrust from the left motor 11, actuation of a foot switch 40 results in the production of reverse thrust from the left motor 11, and actuation of foot switch 41 results in the production of reverse thrust from the right motor 12.

An advantageous feature of the control unit 16 is that it requires relatively little movement of the plate member 17 in order to achieve the required switch actuation which will produce the desired propulsion and steering thrust from the motors. As shown, plate member 17 can be rocked about the pivot point 33 in a fore or aft direction as well as a right or left direction, enabling an operator to selectively actuate one or two switches. In particular, rocking of the plate member 17 forwardly enables the operator to selectively actuate one or both of foot switches 38 and 39 and rocking of the plate member 17 rearwardly enables the operator to selectively actuate one or both of the foot switches 40 and 41. Plate member 17 is, in the illustrated embodiment, biased into a generally horizontal position by means of a resilient bushing 42 which is mounted around a shaft 43 integrally formed with the plate member 17 and secured thereto by means of a retainer nut 44.

Figure 6:
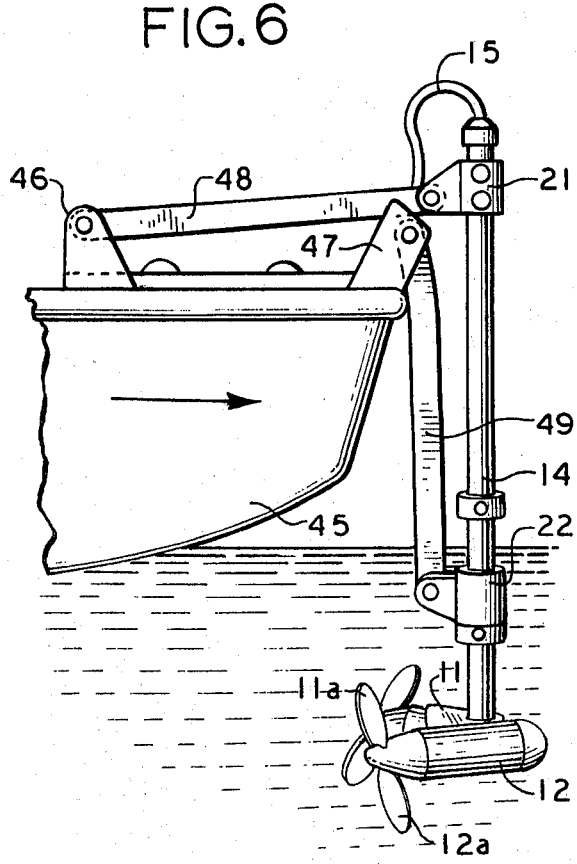
FIG. 6 is a fragmentary elevational view illustrating a fishing boat equipped at the prow thereof with a motor support bracket and the assembly shown in FIG. 1.
Figure 8:
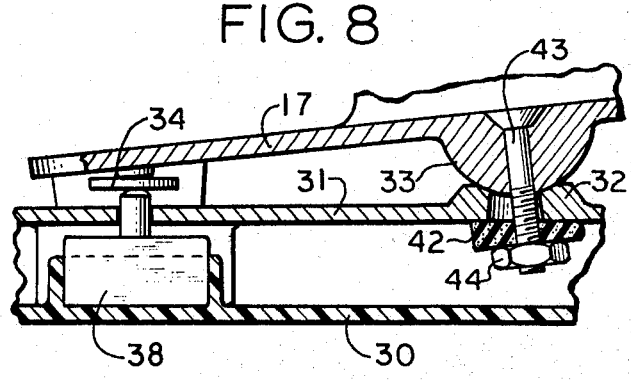
FIG. 8 is a fragmentary sectional view of the control unit shown in FIG. 5 taken along the line 8—8 of FIG. 5.

Referring now to FIG. 6, the shaft 14 is depicted in a service position with the electric motors 11 and 12 submerged below the water surface in position to propel the boat 45 in the direction desired by the operator. As shown, mounting ears 46 and 47 secured to the boat 45 are respectively connected to slidable sleeves 21 and 22 through a pair of link members 48 and 49. As will be apparent, the motors 11 and 12 can be readily moved into a storage position in which the shaft 14 will be in generally parallel relationship with the upper surface of the boat 45. It should be appreciated, however, that the motor mount support depicted in FIG. 6 is merely illustrative of one form of such support and that suitable equivalent substitutes therefor will be apparent to those skilled in this art.

Figure 9:
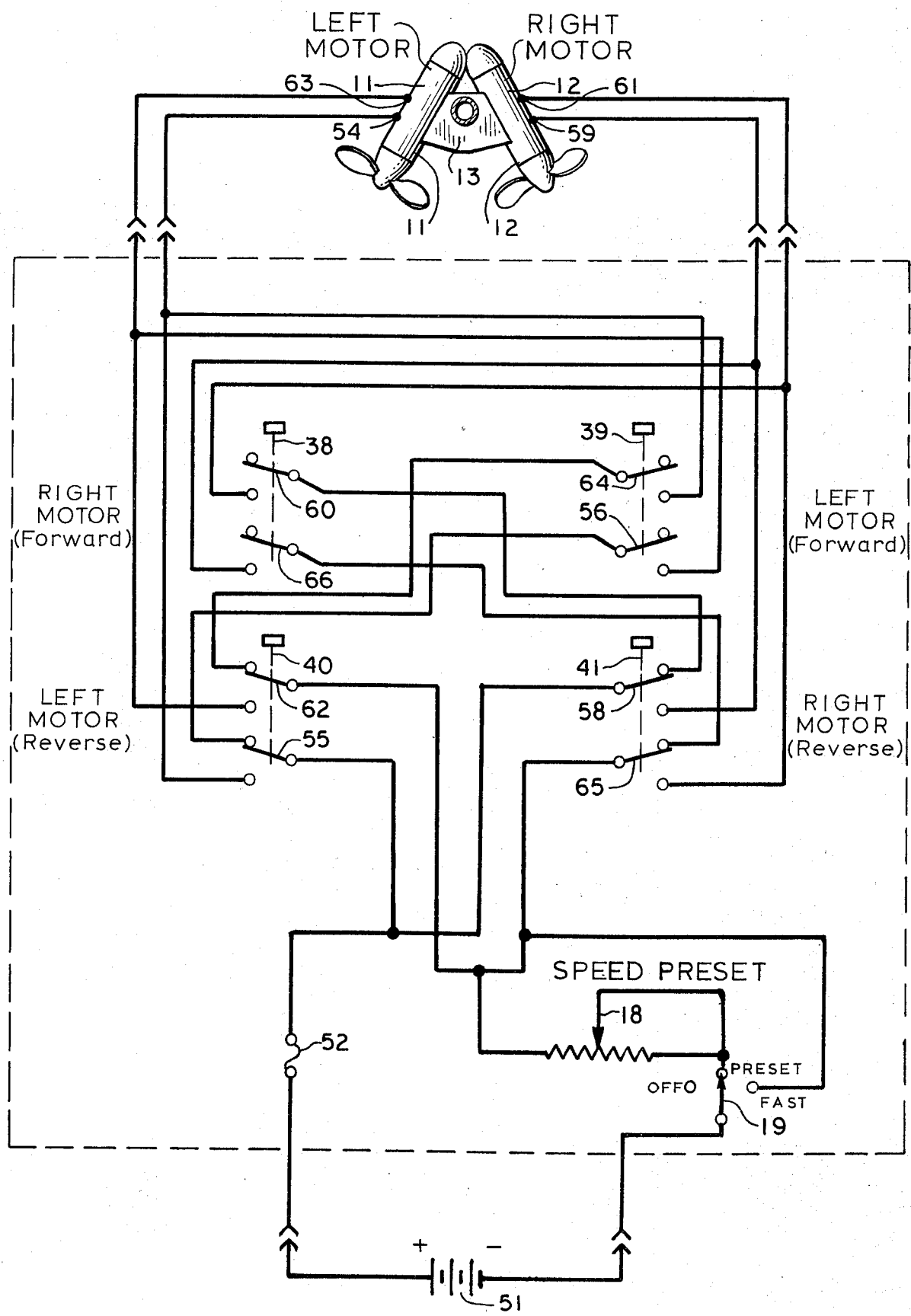
FIG. 9 is a circuit diagram of a suitable control circuit which may be used in the apparatus of the present invention.

Referring to the electrical circuit shown in FIG. 9, operating power is obtained for the propeller drive motors 11 and 12 from a storage battery 51 which may, for example, comprise a conventional lead acid-type 12 volt automotive battery. The output terminals of this battery are connected by flexible leads to control unit 16, which it will be recalled contains the four operator-actuated foot switches 38, 39, 40 and 41.

Within control unit 16 the positive-polarity terminal of battery 51 is connected through a fuse 52 to the arm 53 of one section of the LEFT MOTOR REVERSE switch 40. The normally open contact to this switch section is connected to one input terminal 54 of the left motor 11. The normally closed contact associated with arm 55 is connected to the arm 56 of one section of the LEFT MOTOR FORWARD switch 39. The normally closed contact of this switch section is not connected and the normally open contact is connected to the other input terminal 57 of motor 11.

The positive-polarity terminal of battery 51 is also connected through fuse 52 to the arm 58 of one section of the RIGHT MOTOR REVERSE switch 41. The normally open contact of this switch section is connected to one input terminal 59 of the right motor 12. The normally closed contact associated with arm 58 is connected to the arm 60 of one section of the RIGHT MOTOR FORWARD switch 38. The normally closed contact of this switch section is not connected and the normally open contact is connected to the other input terminal 61 of motor 12.

The negative-polarity terminal of battery 51 is connected to the arm of a three-position OFF-PRESET-FAST function selector switch 19. The OFF terminal of switch R is not connected, the PRESET terminal is connected to one end terminal and to the arm of a SPEED PRESET potentiometer 18, and the FAST terminal is connected to the other end terminal of the potentiometer. This end terminal is also connected to the arm 62 of a second switch section of the LEFT MOTOR REVERSE switch 40. The normally open contact associated with arm 62 is connected to terminal 63 of motor 11 and the normally closed contact is connected to the arm 64 of a second switch section of the LEFT MOTOR FORWARD switch 39. The normally open contact of this switch section is not connected and the normally closed contact is connected to terminal 54 of motor 11.

The other end terminal of SPEED PRESET potentiometer 18 is connected to the arm 65 of a second section of the RIGHT MOTOR REVERSE switch 41. The normally open contact associated with arm 65 is connected to input terminal 61 of motor 12, and the normally closed contact is connected to the arm 66 of a second section of the RIGHT MOTOR FORWARD switch 38. The normally closed contact of this switch section is not connected and the normally open contact is connected to input terminal 59 of motor 12.

In operation, mode selector switch 19 is positioned by the operator in either the PRESET position for slow speed operation as when trolling, or in the FAST position for higher speed operation, as when moving from one fishing location to another. The operator then depresses one or more of the four motor control foot switches 38, 39, 40 and 41 to operate motors 11 and 12 to drive the boat is a desired direction. For example, to turn the boat right the left motor 11 is operated in a forward direction by depressing foot switch 39. This establishes a circuit from the positive terminal of battery 51 through fuse 52, arm 55 of switch 40, and arm 56 of switch 39 to the input terminal 63 of drive motor 11. At the same time, a circuit is also established from the negative terminal of battery 51 through switch 19, potentiometer 18, arm 62 of switch 40, and arm 64 of switch 39 to the input terminal 54 of motor 11. As a result, current is supplied to motor 11 such that terminal 63 is positive and terminal 54 is negative, causing motor 11 to turn propeller 11a in a direction which produces a forward thrust.

Operation of the left drive motor 11 in the opposite or reverse direction is obtained by releasing switch 39 and depressing switch 40. This establishes a circuit from the positive terminal of battery 51 through fuse 52 and arm 55 of switch 40 to motor terminal 54. At the same time, a circuit is also established from the negative terminal of battery 51 through switch 19, potentiometer 18, and arm 62 of switch 40 to motor terminal 63. As a result, current is supplied to motor 11 such that terminal 54 is positive and terminal 63 is negative, causing the motor to drive the propeller 11a in a direction which produces a reverse direction thrust.

The right motor 12 is similarly controlled by motor control switches 38 and 41. To urge the boat in a right turn, the right motor is operated in a forward direction by depressing switch 38. This establishes a circuit from the positive terminal of battery 51 through fuse 52, arm 58 of switch 41, and arm 60 of switch 38 to the input terminal 61 of drive motor 12. At the same time, a circuit is also established from the negative terminal of battery 51 through switch 19, potentiometer 18, arm 65 of switch 41 and arm 66 of switch 38 to the input terminal 59 of drive motor 12. As a result, current is supplied to drive motor 12 such that terminal 61 is positive and terminal 59 is negative, causing motor 12 to drive propeller 12a in a direction which produces a forward thrust.

Operation of the right drive motor 12 in the opposite or reverse direction is obtained by releasing switch 38 and depressing switch 41. This establishes a circuit from the positive terminal of battery 51 through fuse 52 and arm 58 of switch 41 to motor terminal 59. At the same time, a circuit is also established from the negative terminal of battery 51 through switch 19, potentiometer 18, and arm 65 of switch 41 to motor terminal 61. As a result, current is supplied to motor 12 such that terminal 59 is positive and terminal 61 is negative causing the motor to drive propeller 12a in a direction which produces a reverse thrust.

It will be appreciated that more effective control of the boat can be obtained by operating the motors simultaneously in the same or opposite directions depending on the maneuver to be performed. For example, to drive the boat straight ahead motors 11 and 12 can be operated in the forward direction by simultaneously depressing switches 38 and 39. To operate the boat in the reverse direction, both motors can be operated in the reverse direction by simultaneous depressing switches 40 and 41.

To turn the boat to the left, switch 38 is depressed to operate motor 12 in the forward direction. To turn the boat hard left, switch 40 is also depressed causing motor 11 to simultaneously operate in a reverse direction. Similarly, to turn the boat to the right, switch 39 is depressed to operate drive motor 11 in the forward direction. To turn the boat hard right, switch 41 is also depressed causing motor 12 to simultaneously operate in a reverse direction.

To achieve a preset trolling speed, potentiometer 18 is switched in series with the motors by positioning mode selector switch 19 to the PRESET position, and the arm of the potentiometer is adjusted for the desired speed. When it is desired to speed up the boat, as when moving from one fishing spot to another, it is merely necessary to position the selector switch 19 to its FAST position to bypass potentiometer 18 causing the full output of battery 51 to be applied to the motors then selected by foot switches 38, 39, and 41.

While circuitry has been shown wherein the current supplied to motors 11 and 12 is controlled by switches 38, 39, 40 and 41 having contacts serially connected between the motors and battery 51, it will be appreciated that relay circuitry could also be utilized for this purpose. That is, switching of the current supplied to the motors could be accomplished by relay contacts contained in control unit 16 or in a separate enclosure and the actuation of the relays could be controlled by user-actuable switches. This would have the advantage of avoiding the need for the control switches to carry the relatively high current required by the motors. Instead, the motor current would be carried by heavy duty relay contacts and only the relatively small current required by the relay coils would be carried by the control switches. It is further contemplated that instead of relays solid state switching circuitry could be employed. In such cases series-connected transistors could be employed for controlling current to the motors, or appropriate SCR or triac switching devices could be employed in conjunction with a battery-powered inverter current source.

In the system shown in FIG. 9, it is comtemplated that drive motors 11 and 12 and battery 51 be connected to control unit 16 by means of flexible cables of appropriate length. Suitable connectors may be provided where these cables enter the control unit to facilitate disconnecting the motors and battery when necessary. It will be appreciated that while a single battery 51 is shown for operating the two motors 11 and 12, it would be possible to utilize one or more additional batteries connected in either series or parallel to obtain a desired current and voltage rating for operating the motors. In this case, additional circuitry could be provided within control unit 16 for selecting the batteries to either a series or parallel combination, either to achieve additional speed control, or to enable operator selection of a fresh battery should one battery become exhausted. Also, charging circuitry could be included in the control box, operable either from an alternating current land-based source, or from another electrical source contained on the boat, e.g. the output of an inboard or outboard gasoline-powered engine, to accomplish recharging of battery 51.

Drive motors 11 and 12 in the illustrated circuit are conventional reversible DC motors providing full speed output with an applied voltage equal to the battery voltage, typically in the order of 6, 12 and 24 volts. Drive motors having other voltage ratings, however, may be provided with a suitably rated battery or combination of batteries.

Referring to FIG. 10, a conventional bass fishing boat 45 is depicted showing the motors 11 and 12 are mounted to the forward or prow section of the boat in a manner which affords complete clearance along each of the port and starboard sides of the boat 45. As shown, the control unit 16 has been positioned adjacent the middle of the boat with the storage battery shown in phantom and positioned adjacent thereto. If desired, however, the dual motor assembly could be located along the port side of the boat as depicted in phantom with the respective motors being designated by the reference numerals 11' and 12', or at the stern of the boat as likewise shown in phantom with the respective motors being designated by the reference numerals 11'' and 12''. Accordingly, unlike heretofore available prior art dual motor systems, the dual motor system of the present invention enables the operator to selectively locate the motors at any desired location on the boat without sacrificing steering control and, at the same time, minimize interference with the operator's use of desired fishing locations on the boat such as, for example, the port and starboard sides thereof.

FIG. 11 illustrates a modified embodiment of the present invention wherein the reversible electric motors 11 and 12 are respectively fixedly secured to the lower ends of motor support shafts 71 and 72 which, in turn, have their upper ends secured to a V-shaped clamp 73. End portions of V-shaped clamp 73 are respectively provided with a pair of bores which are sized to receive the upper ends of the shafts 71 and 72. A pair of shaft locking set screw retainers 76 and 77 respectively serve to lock the shaft 71 and 72 in the respective bores through which they pass so as to assure that the motors 11 and 12 are retained in a fixed angular relationship to each other in accordance with the present invention. Power to the electric motors 11 and 12 is supplied through a pair of flexible leads 78 and 79 which respectively pass through hollow cores in the shafts 71 and 72. As shown, clamp 73 includes a central portion 80 which is adapted to receive a mounting shaft 81 which, is a known manner, can be either directly received within a mounting bore in the boat itself or connected to conventional clamp means for securing the assembly to a boat at a desired location.

A yet further embodiment of the present invention is shown in FIG. 12. In this regard, it will be noted that the FIG. 12 embodiment is similar to that shown and described in conjunction with FIG. 11 in that it likewise includes dual shafts 83 and 84 which are respectively fixed at their lower ends to the motors 11 and 12. Shafts 83 and 84 are maintained in fixed spaced apart relationship to each other by a triangular clamp 85 having bores 86 and 87 which respectively receive the shafts 83 and 84. A pair of set screw type retainers 88 and 89 respectively serve to lock the shafts 83 and 84 in fixed position with each other and to prevent rotation thereto so as to assure that the motors 11 and 12 are maintained in fixed angular relationship with each other in accordance with an important aspect of this invention. A mounting shaft 90 snugly received in a bore 91 of triangular clamp 85 and locked in fixed axial and rotational position therein by means of a set screw type retainer 92 enables the assembly to be directly mounted to a fishing boat in a suitable manner which will be apparent to those skilled in this art.

FIGS. 13 and 14 depict a modified control unit in the form of a mat or carpet-type unit 93 in which the respective foot switches 38, 39, 40 and 41 are preferably located below a suitable protective covering 94 (see FIG. 14). With the unit 93, depression of the portion of the protective covering 94 which overlies the desired foot switch results in that switch being actuated to produce the desired thrust from one or both of electric motors 11 and 12. As depicted in FIG. 14, this unit can be constructed with a suitable base 95 having a central core portion therein adapted to receive the appropriate circuitry and with a suitable spacer member 97 having suitable bores 98 formed therein to receive the respective switches, such as is shown with switch 41. As such, it will be readily apparent that the embodiment shown in FIGS. 13 and 14 offers many of the advantages of the control unit 16 previously described and none of the previously described disadvantages of the prior art electric motor steering devices.

While in the foregoing specification various embodiments of the present invention have been described, it will be apparent to those skilled in this art that modifications and variations therefrom may be made without departing from the spirit and scope of this invention. Accordingly, the subject invention is to be limited only by the scope of the appended claims.

I claim

1. A propulsion and steering control system for a fishing boat, comprising: first and second reversible electric motors adapted to be mounted to a fishing boat in a fixed angular relationship to each other, each of said electric motors including a propeller which can be selectively driven about an axis of rotation in a clockwise direction to produce a thrust in a first direction or in a counterclockwise direction to produce a thrust in a second direction opposite to said first direction, said fixed angular relationship between said electric motors being defined by and between the axes of rotation of the propellers of said first and second electric motors as an angle of from approximately 30° to 120°; and, control means operatively connected to each of said first and second motors to selectively and independently produce thrust in said first or second direction with one or both of said motors so as to achieve propulsion and steering effect upon a fishing boat equipped with said system while maintaining said motor in said fixed angular relationship to each other and without requiring movement of either of said motors, said control means including a switch assembly which includes at least four foot-actuated switches, two of which are operatively connected to said first motor and which respectively, when activated, produce a thrust in said first or second direction with said first motor and the remaining two of which are likewise operatively connected to said second motor and which, when activated, respectively produce a thrust in said first or second direction with said second motor.

2. The propulsion and steering control system of claim 1 wherein said control means comprises a control circuit, said control circuit including a first operating mode and a second operating mode, said first operating mode being adapted to drive one or both of said electric motors at a selectively variable operator preset reduced speed, said second operating mode being adapted to drive one or both of said motors at a fixed maximum speed, and a switch for enabling an operator to selectively utilize said first or second operating mode.

3. The propulsion and steering control system of claim 1 wherein said control means includes a pivotally mounted plate which is operatively associated with said switch assembly in a manner by which an operator can selectively actuate not more than two of said four switches.

4. The propulsion and steering control system of claim 1 wherein said control means comprises a plate member which is pivotally mounted to a base to permit rocking thereof about a pivot point in a fore or aft direction as well as a right or left direction, all of said four switches being positioned below said plate, two of said four switches being located forwardly of said pivot point and respectively on the right and left sides thereof and the other two of said switches located rearwardly and respectively on the right and left sides of said pivot point, whereby an operator can selectively activate one or both of said switches located forwardly of said pivot point, one or both of said switches located rearwardly of said pivot point, one or both fore and aft switches on the left of said pivot point, or one or both of said fore and aft switches located on the right of said pivot point.

5. A propulsion and steering control system for a fishing boat comprising: a motor support bracket adapted to be mounted to a fishing boat; first and second reversible electric motors mounted to said motor support bracket in a fixed angular relationship to each other and in a fixed relationship with said motor support bracket, each of said electric motors including a propeller which can be selectively driven about an axis in a clockwise direction to produce a thrust in a first direction or in a counterclockwise direction to produce a thrust in a second direction opposite to said first direction, said fixed angular relationship between said electric motors being defined by and between the axes of rotation of the propellers of said first and second electric motors as an angle of from approximately 30° to 120°; and, control means operatively connected to each of said first and second motors to selectively and independently produce thrust in said first or second direction with one or both of said motors so as to achieve a desired propulsion and steering effect upon a fishing boat equipped with said system while maintaining said motors in said fixed angular relationship to each other and without rotation of said motor support bracket, said control means including a switch assembly which includes at least four foot-actuated switches, two of which are operatively connected to said first motor and which respectively, when activated, produce a thrust in said first or second direction with said first motor and the remaining two of which are likewise operatively connected to said second motor and which, when activated, respectively produce a thrust in said first or second direction with said second motor.

6. The propulsion and steering control system of claim 5 wherein said control means comprises a control circuit, said control circuit including a first operating mode and a second operating mode, said first operating mode being adapted to drive one or both of said electric motors at a selectively variable operator preset reduced speed, said second operating mode being adapted to drive one or both of said motors at a fixed maximum speed, and a switch for enabling an operator to selectively utilize said first or second operating mode.

7. The propulsion and steering system of claim 5 wherein said motor support bracket comprises: a shaft; a spacer block at one end of said shaft to which said first and second motors are mounted in said fixed angular relationship to each other; and means for selectively positioning said shaft in a non-service position wherein said motors can be removed from the water and in a service position wherein said motors can be submerged below the water surface.

8. The propulsion and steering control system of claim 5 wherein said motor support bracket comprises: a clamp; a pair of shafts each havine one end fixed to said clamp and an opposite end fixed to one of said motors whereby said clamp and shafts cooperate to maintain said first and second electric motors in said fixed angular relationship to each other; and means for selectively positioning said shaft in a non-service position in which said motors are out of the water and in a service position in which said motors are submerged below the water surface.

9. The propulsion and steering control system of claim 5 wherein said control means comprises a plate pivotally mounted to a base and operatively associated with said switch assembly in a manner by which an operator can selectively actuate not more than two of said switches.

10. The propulsion and steering control system of claim 5 wherein said switch assembly comprises a plate member pivotally mounted to a base and rockable about a pivot point in a fore or aft direction as well as a right direction, all of said switches being positioned on said base and below said plate with two of said four switches being located forwardly of said pivot point and respectively to the right and left thereof, and the other two of said switches being located rearwardly of said pivot point and respectively to the right and left thereof, whereby an operator can selectively activate one or both of said switches located forwardly of said pivot point, one or both of said switches located rearwardly of said pivot point, one or both of said fore and aft switches to the left of said pivot point, or one or both of said fore and aft switches to the right of said pivot point.

11. A propulsion and steering control system for fishing boats comprising: a motor support bracket mounted to said boat; first and second reversible electric motors mounted to said motor support clamp in a fixed angular relationship to each other and in a fixed relationship with said motor support clamp, each of said electric motors including a propeller which can be selectively driven about an axis in a clockwise direction to produce a thrust in a first direction and in a counterclockwise direction to produce a thrust in a first direction and in a counterclockwise direction to produce a thrust in a second direction opposite to said first direction, said fixed angular relationship between said electric motors being defined by and between the axes of rotation of the propellers of said first and second electric motors as an angle of from approximately 30° to 120°; control means for independently driving each of said motors to selectively produce thrust in said first or second direction, said control means including at least four separate four-actuated switches which are operatively connected to said first and second electric motors to selectively and independently enable an operator to produce first or second direction thrust with each of said motors, said motor support bracket including a clamp, a pair of shafts each having one end fixed to said clamp and an opposite end to one of said motors, said clamp and shafts cooperating to maintain said first and second motors in said fixed angular relationship to each other, and means for selectively positioning said shaft in a non-service position in which said motors are positioned out; of the water and in a service position in which said motors are below the water surface.

12. The propulsion and steering control system of claim 11 wherein said control means comprises a control circuit, said control circuit including a first operating mode and a second operating mode, said first operating mode being adapted to drive one or both of said electric motors at a selectively variable operator preset reduced speed, said second operating mode being adapted to drive one or both of said motors at a fixed maximum speed, and a switch for enabling an operator to selectively utilize said first or second operating mode.

13. The propulsion and steering control system of claim 11 wherein said control means comprises a pivotally mounted plate operatively associated with said four separate switches in a manner by which an operator can selectively activate not more than two of said switches.

14. The propulsion and steering control system of claim 13 wherein said switch assembly comprises a plate member supported on a base at a generally centrally located pivot point about which said plate can be rocked in a fore or aft direction as well as a right or left direction, all of four switches being positioned below said plate with two of said four switches being located forwardly of said pivot point and respectively on the right and left sides thereof and the other two of said switches being located rearwardly of said pivot point and respectively located on the right and left sides thereof, whereby an operator can selectively, by rocking of said pivot plate, activate one or both of said switches located forwardly of said pivot point, one or both of said switches located rearwardly of said pivot point, one or both of said fore and aft switches located to the left of said pivot point, or one or both of said fore and aft switches located to the right of said pivot point.

15. In a propulsion and steering control system of the type wherein a pair of reversible electric motors each of which includes a propeller are selectively and independently regulated by control means to produce a forward or reverse thrust therewith, the improvement wherein said control means comprises a switch assembly which includes at least four foot-actuated switches, two of which are operatively connected to a first of said pair of electric motors and which, when respectively activated, selectively produce a forward or reverse thrust with said first motor, and the remaining two of which are likewise operatively connected to the second of said pair of electric motors and which, when respectively activated, selectively produce a forward or reverse thrust with said second motor.

16. The improvement of claim 15 wherein said control means comprises a plate member which is pivotally mounted to a base to permit rocking thereof about a pivot point in a fore or aft direction as well as a right or left direction, all of said four switches being positioned below said plate, with two of said four switches being located forwardly of said pivot point and respectively to the right and left thereof, and the other two of said switches being located rearwardly of said pivot point and respectively on the right and left thereof, whereby an operator can selectively activate one or both of said switches located forwardly of said pivot point, one or both of said switches located rearwardly of said pivot point one or both of said fore and aft switches to the left of said pivot point, or one or both of said fore and aft switches to the right of said pivot point.

17. In a propulsion and steering control system of the type wherein a pair of reversible electric motors each of which includes a propeller are selectively and independently regulated by control means to provide a forward or reverse thrust therewith, the improvement wherein said pair of electric motors are mounted to a common motor support in a fixed angular relationship to each other of from aproximately 30° to 120° as defined between the axes of rotation of the respective propellers thereof and said control means includes a switch assembly which has at least four foot-actuated switches, two of which are operatively connected to a first of said pair of reversible electric motors and which, when respectively activated, selectively produce a thrust in a forward or reverse direction with said first motor, and the remaining two of which are likewise operatively connected to a second of said pair reversible electric motors and which, when respectively activated, selectively produce a thrust in a forward or reverse direction with said second motor.

18. The improvement of claim 17 wherein said control means comprises a plate member pivotally mounted to a base and rockable about a pivot point in a fore or aft direction as well as a right or left direction, all of said switches being positioned on said base and below said plate with two of said four switches being located forwardly of said pivot point and respectively to the right and left thereof, and the other two of said switches being located rearwardly of said pivot point and respectively to the right and left thereof, whereby an operator can selectively activate one or both of said switches located forwardly of said pivot point, one or both of said switches located rearwardly of said pivot point, one or both of said fore and aft switches to the left of said pivot point, or one or both of said fore and aft switches to the right of said pivot point.

19. The improvement of claim 17 wherein said control means includes a control circuit, said control circuit including a first operating mode and a second operating mode, said first operating mode being adapted to drive one or both of said electric motors at a selectively variable operator preset reduced speed, said second operating mode being adapted to drive one or both of said motors at a fixed maximum speed, and a switch enabling an an operator to selectively utilize said first or second operating mode.

20. The improvement of claim 17 wherein said fixed angular relationship between the axes of rotation of the respective propellers of said pair of reversible electric motors is approximately 60°.

* * * * *